United States Patent [19]

Stanko

[11] 3,995,685
[45] Dec. 7, 1976

[54] FOUNDRY FLASK CLAMP

[76] Inventor: John J. Stanko, 327 Coraopolis Road, Coraopolis, Pa. 15108

[22] Filed: May 19, 1975

[21] Appl. No.: 578,603

[52] U.S. Cl. .............................. 164/386; 164/384; 249/219 R; 403/374; 403/381
[51] Int. Cl.² ........................................ B22C 21/08
[58] Field of Search .......... 164/386, 387, 388, 392, 164/384, 389; 249/219 R, 194; 24/25; 285/421; 403/374, 381

[56] References Cited
UNITED STATES PATENTS

| | | | |
|---|---|---|---|
| 146,207 | 1/1874 | Schneider | 164/387 X |
| 487,851 | 12/1892 | Morris | 249/194 UX |
| 624,770 | 5/1899 | Eibee | 24/25 X |
| 1,002,708 | 9/1911 | Krentzberg | 164/386 |
| 1,540,570 | 6/1925 | Roberts | 249/219 R X |
| 3,288,427 | 11/1966 | Pluckebaum | 249/192 |

FOREIGN PATENTS OR APPLICATIONS
581,475  8/1958  Italy ............................. 249/219 R

*Primary Examiner*—Ronald J. Shore
*Attorney, Agent, or Firm*—Buell, Blenko & Ziesenheim

[57] ABSTRACT

Means are provided for joining a pair of foundry flasks which includes in combination one half of a V-shaped dove tail flange along each adjacent edge to be joined so as to form a V-shaped dove tail clamp and generally C-shaped clamp member having a jaw at each end adapted to slidably engage the dove tail flange and having a central depending tongue between the jaws adapted to bear on the two adjacent flanges at this juncture.

4 Claims, 3 Drawing Figures

FOUNDRY FLASK CLAMP

This invention relates to foundry flasks and clamps and particularly to a foundry flask and clamp designed to eliminate the breakage and the danger associated therewith which has characterized foundry flasks of the past.

Foundry flasks are generally held together by a clamp in the form of a flat bridge with depending arms at each end which engage transverse flanges on the edge of each flask part and may be wedged to tighten the flask. Typical clamps are illustrated at pages 14 and 21 of "Foundry Work", 1939 by Stimpson, Gray and Grennan and published by American Technical Society, Chicago, Illinois, and in U.S. Pat. No. 934,410. These clamps have unfortunately been characterized by a substantially high rate of breakage, with resultant accidents and loss of castings. In order to avoid this, many flasks are also provided with holes and safety bolts through the flanges in addition to the clamps. This, of course, involves more expense and labor both in set ups and in removal of the bolts.

The present invention eliminates all of these problems of prior art flasks and clamps and provides a novel clamp and combination of flask and clamp means for foundry use which is simple to install and inexpensive to make and use.

In this invention there is provided on each adjacent flask edge to be joined a one half V-shaped dove tail flange, said adjacent flanges form a V-shaped dove tail, a generally C shaped clamp member having a jaw at each end adapted to slidably engage the dove tail flange and a central depending tongue adapted to bear on the two adjacent flanges at their juncture with one another. Preferably the two legs of the C clamp are at an obtuse angle to one another, which angle is the inverse of the angle between the V-shaped dove tail.

In the foregoing general description I have set out certain objects, purposes and advantages of my invention. Other objects, purposes and advantages will be apparent from a consideration of the following description and the drawings in which.

Figure 1:
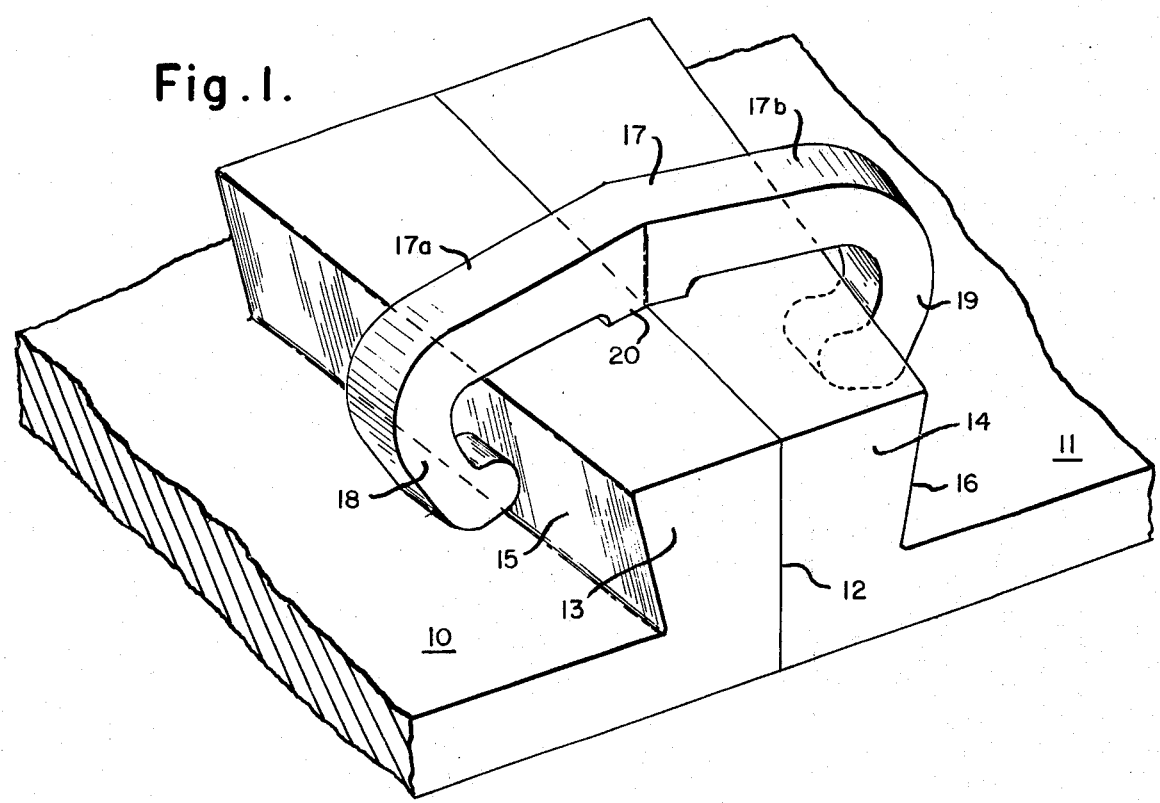
FIG. 1 is an isometric fragmentary view of two adjacent flask portions and the clamp means of this invention.
Figure 2:
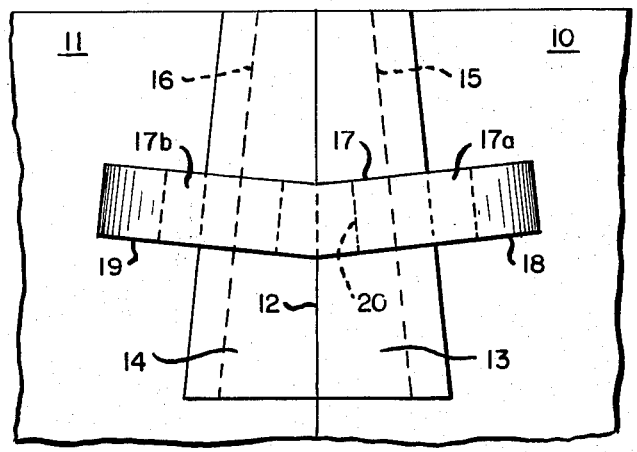
FIG. 2 is a top plan view of the clamp and flask fragment of FIG. 1.
Figure 3:
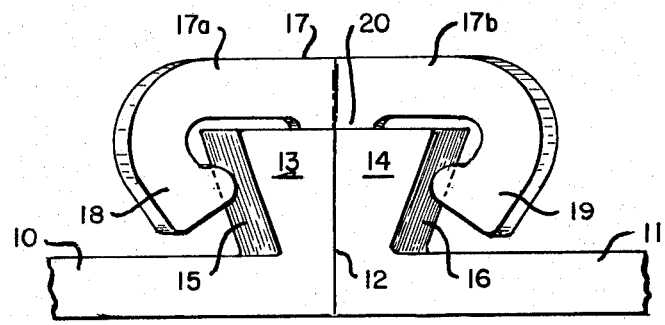
FIG. 3 is an end view of the clamp and flask of FIG. 1.

Referring to the drawings I have illustrated a pair of adjacent flask parts 10 and 11. Each of the parts 10 and 11 has along the parting line 12 flanges 13 and 14 respectively, each in the form of one half of a V-shaped dove tail so as to provide on the outside of each a dovetail surface 15 and 16 spaced from the parting line 12.

A generally C-shaped clamp 17 having jaws 18 and 19 at its ends is provided for slidably engaging the dovetail surfaces 15 and 16 so that forcing the clamp onto the surfaces acts to wedge the flask parts together. Preferably the two halves of the C clamp 17a and 17b are formed at an obtuse angle which is the inverse of the angle of the V-shaped dovetail and provides the maximum frictional engagement between the jaws and the dovetail surfaces.

A depending tongue 20 extends downwardly from the center of the C-shaped member to engage the top surfaces of the flanges 13 and 14. This helps maintain the two flask parts in alignment along the parting line thus maintaining the flask parts in alignment.

The clamp structure of this invention provides the necessary rigidity and yet has sufficient resilience to absorb expansion of the flask as its temperature rises during casting.

In the foregoing specification I have set out certain preferred embodiments of this invention, however, it will be obvious that this invention may be otherwise embodied within the scope of the following claims.

I claim:

1. In combination a pair of foundry flask parts to be joined, one half of a V-shaped dove tail flange along each edge to be joined, integral with the flask, said flanges abutting one another at the edges to be joined to form a generally flat surface across the two flanges, the adjacent flanges forming a V-shaped dove tail, a generally C-shaped clamp member having two legs extending from a center line at an obtuse angle to one another and having a jaw at each end adapted to slidably engage the dove tail flange, saw jaws acting transversely on the dove tail surfaces of said flanges to urge them together and a central depending tongue on the C-shaped member beneath the center line adapted to bear on the two adjacent flanges at their juncture.

2. The combination as claimed in claim 1 wherein the obtuse angle is inverse to the angle of the V-shaped dove tail.

3. A clamp for joining a pair of foundry flask parts together along a parting line, each flask part having one half of a V-shaped dove tail flange along each edge to be joined integral with the flask parts forming a V-shaped dove tail at the parting line, said flanges abutting one another along the parting line said clamp comprising a generally C-shaped member having two legs extending from a center line at an obtuse angle to one another and having a jaw at each end adapted to slidably engage the dove tail flange and a central depending tongue on the C-shaped member intermediate its ends adapted to bear on the two adjacent flanges at their juncture along the parting line.

4. A clamp as claimed in claim 3 wherein the obtuse angle is inverse to the angle of the V-shaped dove tail.